(12) United States Patent
Canard

(10) Patent No.: US 6,349,880 B1
(45) Date of Patent: Feb. 26, 2002

(54) ARRANGEMENT FOR THE INTERCHANGE OF DATA BETWEEN A RIGID OR SEMI-RIGID DATA MEDIUM AND A DATA INTERCHANGE DEVICE

(75) Inventor: Louis Canard, Nevers (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/572,595

(22) Filed: May 17, 2000

(30) Foreign Application Priority Data

May 17, 1999 (FR) .............................................. 99 06197

(51) Int. Cl.7 .................................................. G06K 7/00
(52) U.S. Cl. ......................................... 235/486; 235/475
(58) Field of Search ................................ 235/486, 475, 235/441

(56) References Cited

U.S. PATENT DOCUMENTS

| | | | | |
|---|---|---|---|---|
| 4,743,746 A | * | 5/1988 | Murschall et al. | 235/486 |
| 4,843,221 A | * | 6/1989 | Ohtsuki et al. | 235/441 |
| 5,780,827 A | * | 7/1998 | Zolkos et al. | 235/441 |
| 5,793,607 A | | 8/1998 | Karidis et al. | |
| 5,899,763 A | | 5/1999 | Kajiura | |
| 6,073,062 A | * | 6/2000 | Hoshino et al. | 701/3 |
| 6,138,916 A | * | 10/2000 | Zolkos et al. | 235/475 |

FOREIGN PATENT DOCUMENTS

| | | | |
|---|---|---|---|
| EP | 0903690 | | 3/1999 |
| JP | 11039442 A | * | 2/1999 |

* cited by examiner

Primary Examiner—Michael G. Lee
Assistant Examiner—Allyson Sanders
(74) Attorney, Agent, or Firm—Liniak, Berenato, Longacre & White

(57) ABSTRACT

The invention proposes an arrangement (10) of the type in which the unit comprises a controlled member (70) for locking the immobilizing lever (34), characterized in that the immobilizing member is a member which is controlled manually by a first "on" push-button (70) mounted to slide between a pushed-in "on" position in which the immobilizing lever (34) is locked in the immobilizing position, and an "out" position of rest, and in that there is a retaining mechanism (104, 120, 118) for automatically keeping the first push-button (70) in the "on" position, the release of which is controlled by a second "off" push-button (94) which is mounted to slide between an "out" position of rest and a pushed-in "off" position in which the first "on" push-button (70) is free to slide.

12 Claims, 5 Drawing Sheets

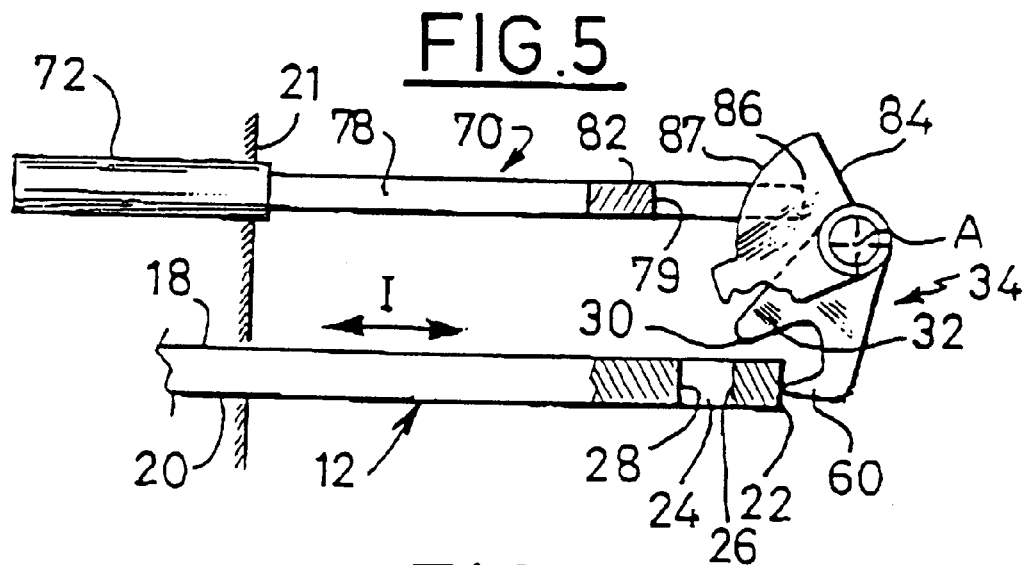
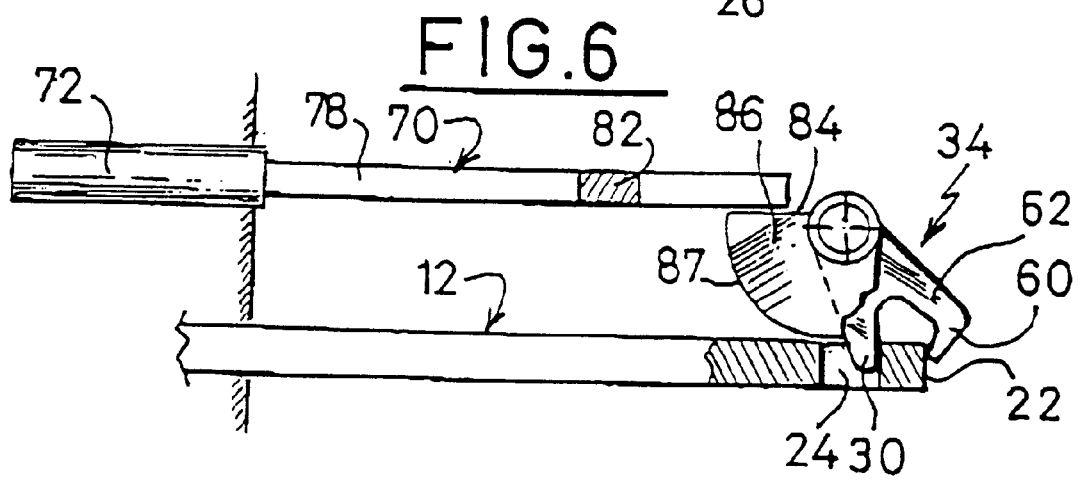
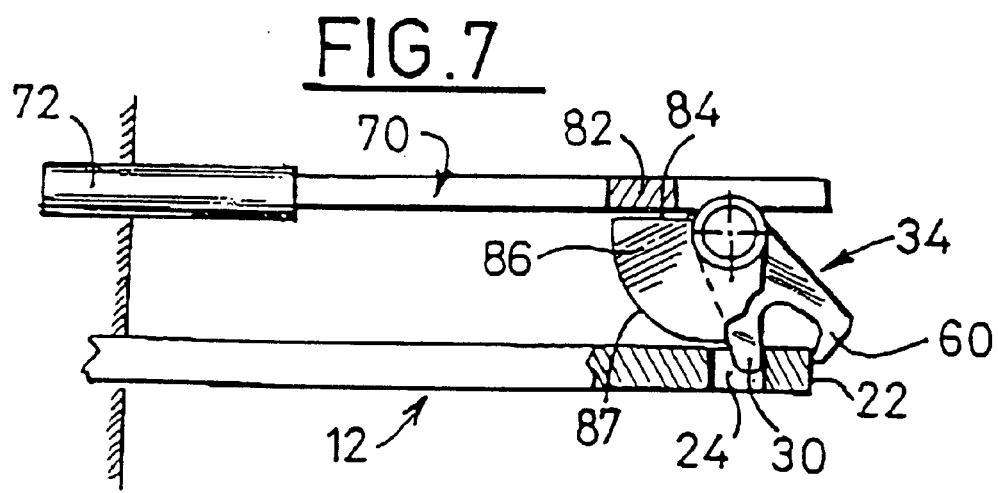

ARRANGEMENT FOR THE INTERCHANGE OF DATA BETWEEN A RIGID OR SEMI-RIGID DATA MEDIUM AND A DATA INTERCHANGE DEVICE

BACKGROUND OF THE INVENTION

1. Field of the Invention

The present invention relates to an arrangement for the interchange of data between a rigid or semi-rigid data medium and a data interchange device, particularly one for reading data contained in the medium.

The invention relates more particularly to such an arrangement intended to be fitted to a motor vehicle and in which the data medium, which is, for example, in the form of a card or badge of rectangular overall shape, carries data identifying the user of the vehicle which, when he introduces his badge into the reading device, authorizes him to use the vehicle by, in particular, allowing him to start the vehicle engine.

2. Description of the Related Art

Numerous examples of such arrangements in which the data medium is a rigid or semi-rigid card comprising, for example, an integrated circuit, or chip, which is connected to reading means of the device by electrical contacts and/or by a data interchange antenna, are known.

When the badge or the card is introduced into the device, the card is introduced manually into a housing in the unit in which the data medium occupies a given active position, and the device which receives the card or the badge comprises means for longitudinally holding this data medium in an active position in the unit so that data interchange can occur correctly.

In the case of an application to a motor vehicle, it is necessary to be able not only to hold the data medium in an active position, but also to lock it by immobilizing it in this position in response to a locking command so as to prevent the driver or a passenger from being able to extract the data medium from the reading device at an inopportune moment under certain vehicle use configurations.

In order to improve the convenience of use of such an arrangement, it has already been proposed that means be provided to assist with introducing the data medium into the device and/or extracting it therefrom. To this end, the data medium comprises, for example, a window, and the unit comprises a lever for immobilizing the medium, which lever is mounted to pivot about an axis between a stable immobilizing position toward which the immobilizing lever is elastically returned and in which an immobilizing finger formed at the free end of one arm of the immobilizing lever extends vertically into the window to longitudinally hold the data medium in an active position in the unit, and a retracted stable position toward which the lever is elastically returned, and in which the immobilizing finger is out of the window, and in which the data medium can be extracted from the unit.

The unit also comprises a controlled member for locking the immobilizing lever in its angular position for immobilizing the data medium, a finger of which can extend facing a part of the immobilizing lever so as to prevent the latter from rotating from its active immobilizing position toward its retracted position.

According to one known embodiment, the member for locking the immobilizing lever is controlled by an electromagnet or by some other type of electrical actuator.

SUMMARY OF THE INVENTION

The invention sets out to provide a new way of controlling the locking member which, in particular, makes the entire arrangement very ergonomic, in association with greater operating safety associated with the sequence of deliberate manual actions on the part of the user as a result of the design according to the invention.

To this end, the invention proposes an arrangement of the aforementioned type, wherein the immobilizing member is a member that is controlled manually by a first "on" push-button mounted to slide between a pushed-in "on" position in which the immobilizing lever is locked in the immobilizing position, and an "out" position of rest toward which it is elastically returned, and wherein there is a retaining mechanism for automatically keeping the first push-button in the "on" position, the release of which is controlled by a second, "off" push-button which is mounted to slide between an "out" position of rest toward which it is elastically returned and a pushed-in "off" position in which the first "on" push-button is free to slide.

According to other features of the invention:

- the two push-buttons, namely the "on" button and the "off" button, are mounted to slide parallel to the longitudinal direction of insertion and extraction of the data medium and, in the "out" position, each push-button protrudes with respect to one and the same wall of the unit;
- the mechanism for automatically retaining the "on" push-button comprises a rocker, mounted to pivot about a fixed axis perpendicular to the direction in which the "off" push-button slides, which comprises a control arm, the free end of which is connected in terms of translation to the "off" push-button, and a retaining arm which carries a retaining finger which extends, parallel to the axis of pivoting of the rocker, inside an L-shaped retaining slot formed in the "on" push-button and which comprises a longitudinal section parallel to the direction in which the "on" push-button slides and in which the retaining finger moves when the "on" push-button is pushed in from its "out" position of rest to its pushed-in "on" position, and comprises a transverse retaining section which the retaining finger automatically enters when the "on" push-button reaches its pushed-in "on" position;
- the "on" push-button comprises a main plate in which the L-shaped slot is formed and which extends in a plane perpendicular to the axis of pivoting of the retaining rocker;
- the retaining rocker comprises a return arm on which a return spring constantly acts to urge the rocker to pivot in the direction that corresponds to the retaining finger entering the transverse arm of the L-shaped slot and to the "off" push-button being returned to the "out" position of rest;
- the return spring is a compression spring mounted longitudinally compressed between the free end of the return arm of the rocker and a bearing tab belonging to the "on" push-button;
- the axis of pivoting of the immobilizing lever is parallel to the plane in which the longitudinal direction of insertion and extraction of the data medium into the unit is located and is perpendicular to this longitudinal direction;
- the immobilizing lever comprises a radial tab which, when the immobilizing lever is in the retracted position, extends across the path of the "on" push-button so as to prevent the latter from being pushed in when there is no data medium in an active position;
- pushing the "on" push-button into the "on" position operates an electric switch borne by the unit;

the electric switch is operated by a part of the "on" push-button;

the arrangement is fitted to a motor vehicle in which the anti-theft functions are partially or completely fulfilled by data processing, some of which data, contained in the data medium, represents an authorized user or a group of authorized users of the vehicle;

the switch belongs to the circuit that supplies electrical power to the vehicle engine starter.

BRIEF DESCRIPTION OF THE DRAWINGS

Other features and advantages of the invention will emerge from reading the detailed description which follows, for an understanding of which reference will be made to the appended drawings in which:

FIG. 5 is a diagrammatic view in longitudinal section of some of the components in which the badge is depicted as it is being introduced into the reading device with the "on" push-button in the "out" position of rest;

FIG. 6 is a view similar to that of FIG. 5 in which the badge is illustrated in an active position and the "on" push-button is illustrated in the position of rest; and FIG. 7 is a view similar to that of FIG. 6, in which the badge is illustrated in an active position and the "on" push-button is illustrated in the pushed-in "on" position in which it locks the badge immobilizing lever in an active position.

DETAILED DESCRIPTION OF THE PREFERRED EMBODIMENTS

Figure 1:
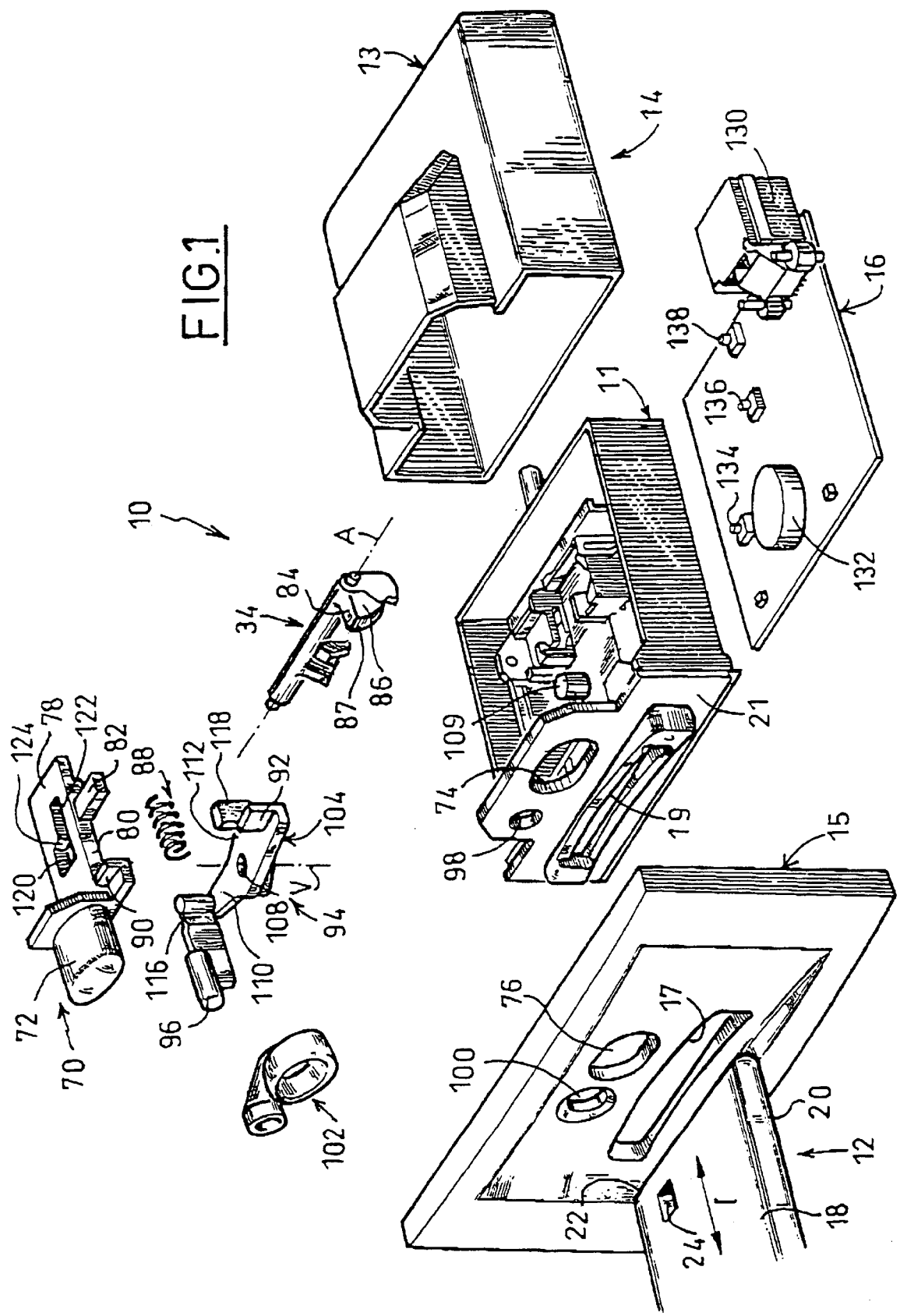
FIG. 1 is a diagrammatic view in exploded three-quarters rear perspective which illustrates some of the main components of an arrangement according to the teachings of the invention.
Figure 2:
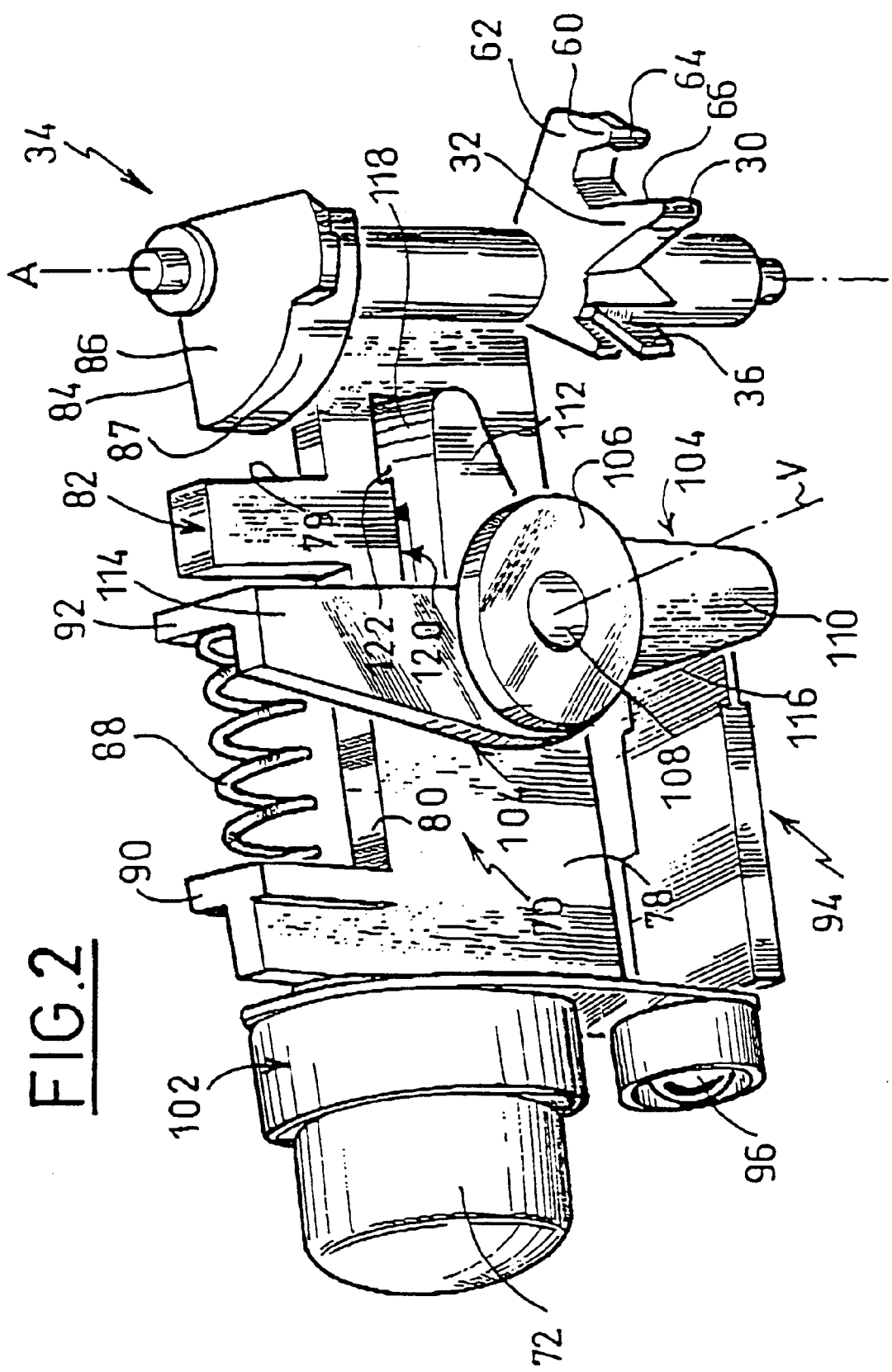
FIG. 2 is a three-quarters rear perspective view from below and on a larger scale which depicts, in particular, the "on" push-button, the "off" push-button and the immobilizing lever.

In the description which will follow, the terms "vertical", "horizontal", "upper", "lower", "front", "rear", etc., are used with reference to the figures to make the description and the claims easier to understand, this all being without implied limitation.

The arrangement 10 in accordance with the teachings of the invention and illustrated in the figures essentially consists of a data medium or badge 12 and of a unit 14, of which the chassis 11, a casing 13, a front cover plate 15 and a lower printed circuit board 16 have been depicted.

The badge 12 in this instance is a rigid element of rectangular overall shape and small thickness which, near its longitudinal rear edge, comprises a part for gripping, allowing it to be handled and, in particular, to be slid parallel to its overall plane.

The badge 12 is a data medium which can be introduced longitudinally, that is to say in the direction "I" parallel to the overall plane of its large upper 18 and lower 20 faces, into the unit 14 and which can be extracted from this unit in the same direction, but in the opposite sense.

The means for guiding the sliding of the badge 12 in the unit 14 are of known overall design and will not be described in detail, the unit 12 comprising an entry slot 17, 19 formed in the front cover plate 15 and in the rear vertical transverse wall 21 of the chassis 11, respectively.

As can be seen from the figures, the badge 12 has, at its front part, and near to its front transverse edge 22, a window 24 of rectangular outline and the sides of which are parallel to those of the badge 12.

The window 24 extends vertically into the badge and passes right through it.

More specifically, and as can be seen particularly in FIGS. 5 to 7, the window 24 is delimited longitudinally by two parallel transverse edges, namely a front edge 26 and a rear edge 28.

The window 24 is an immobilizing window within the meaning of the invention, that is to say it is intended to house an immobilizing member borne by the unit 14 and which will now be described with reference to the figures.

The member for immobilizing the badge 12 in an active position is an immobilizing finger consisting of the free end 30 of an immobilizing arm 32 belonging to an immobilizing lever 34 which is mounted so that it can pivot with respect to the unit about a transverse axis A which is perpendicular to the direction I and parallel to the plane which contains this direction I, this is to say parallel to the overall plane of the badge 12 which forms the medium for the data.

The axis A of pivoting of the lever 34 is therefore fixed and the immobilizing lever 34 is mounted so that it can pivot in both directions about this axis between two stable extreme angular positions which are illustrated in FIGS. 5 and 6.

These are two stable positions toward each of which the immobilizing lever 34 is angularly returned elastically by a bistable return spring, not depicted in the figures, one strand of which spring is housed in a fork 36 of the lever 34.

The first stable position is the one in which its immobilizing finger 30 is retracted, that is to say it does not extend facing the plane in which the badge 12 moves, or, of course, into the immobilizing window 24.

As can be seen in the figures, the immobilizing lever 34 also comprises a control finger 60 which is formed at the free end of a control arm 62 that belongs to the immobilizing lever 34 and which is angularly offset, in the counterclockwise direction when considering FIG. 5, with respect to the immobilizing finger 30.

As can be seen in the figures, in longitudinal section, the control finger 60 has a rounded profile so that it can collaborate in the manner of a cam, via its rear face 64, with the transverse front edge 22 of the badge 12.

In the same way, in longitudinal section, the front edge 66 of the immobilizing finger 30 is inclined to constitute a ramp forming a cam which can collaborate with the front transverse edge 26 of the slot 24.

According to this known arrangement, and by virtue of the presence of the bistable spring, the arrangement affords assistance with pushing the badge into the unit of the data reading device and with extracting it therefrom, while at the same time affording reliable operation insofar as the badge is held in position by the immobilizing finger 30 of the immobilizing lever 34, thus preventing the badge from coming out at an inopportune moment as a result, for example, of the vibrations of the vehicle traveling along.

In order, in particular, to further improve the operating safety, there are means for locking the immobilizing lever 34 in the position for immobilizing the badge 12.

For this purpose, according to the teachings of the invention, there is a manually actuated first push-button 70.

As can be seen in the figures, the push-button 70 consists of a rear part forming a button 72 which projects backward through corresponding openings 74 and 76 formed respectively in the wall 21 and in the front cover plate 15 and of a body forming a pusher 78 which overall is in the form of a horizontal plate parallel to the direction I and to the overall plane of the badge 12, located vertically above the latter.

The longitudinal edge 80 of the plate 78 parallel to the direction I comprises a transverse tab 82 which extends in the plane of the plate 78 and constitutes a finger for locking the immobilizing lever 34 within the meaning of the invention.

The finger 82 is designed to collaborate, as will be explained hereinafter, with the upper face 84 of a stop piece 86 belonging to the immobilizing lever 34 which is in the form of an angular sector produced integrally and therefore rotating as one with the immobilizing lever 34.

Figure 3:
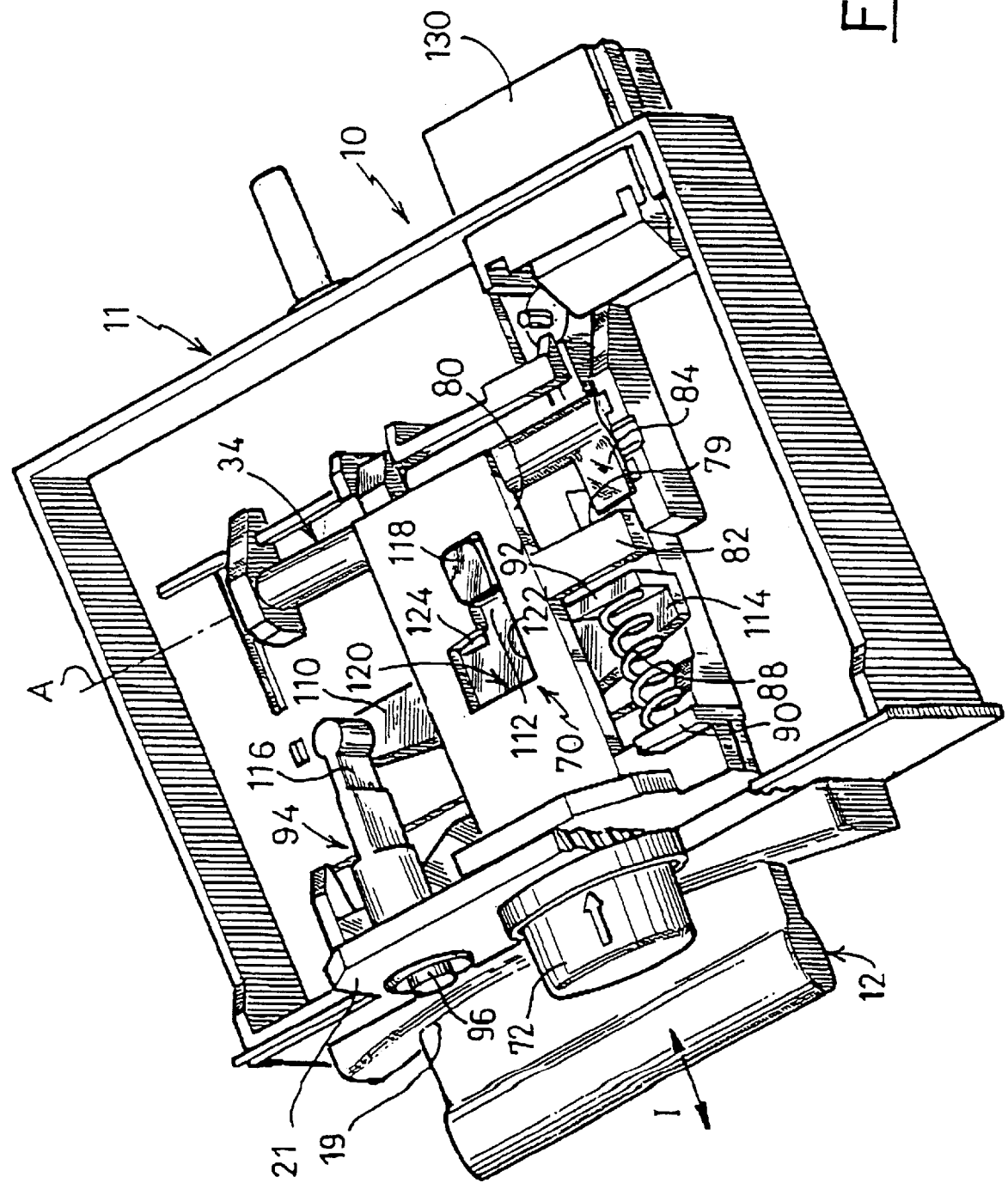
FIG. 3 is a three-quarters rear perspective view from above of the main components of the arrangement according to the invention, in which the badge that forms the data medium is depicted in the active position and in which the "on" push-button is depicted in the "out" position of rest.
Figure 4:
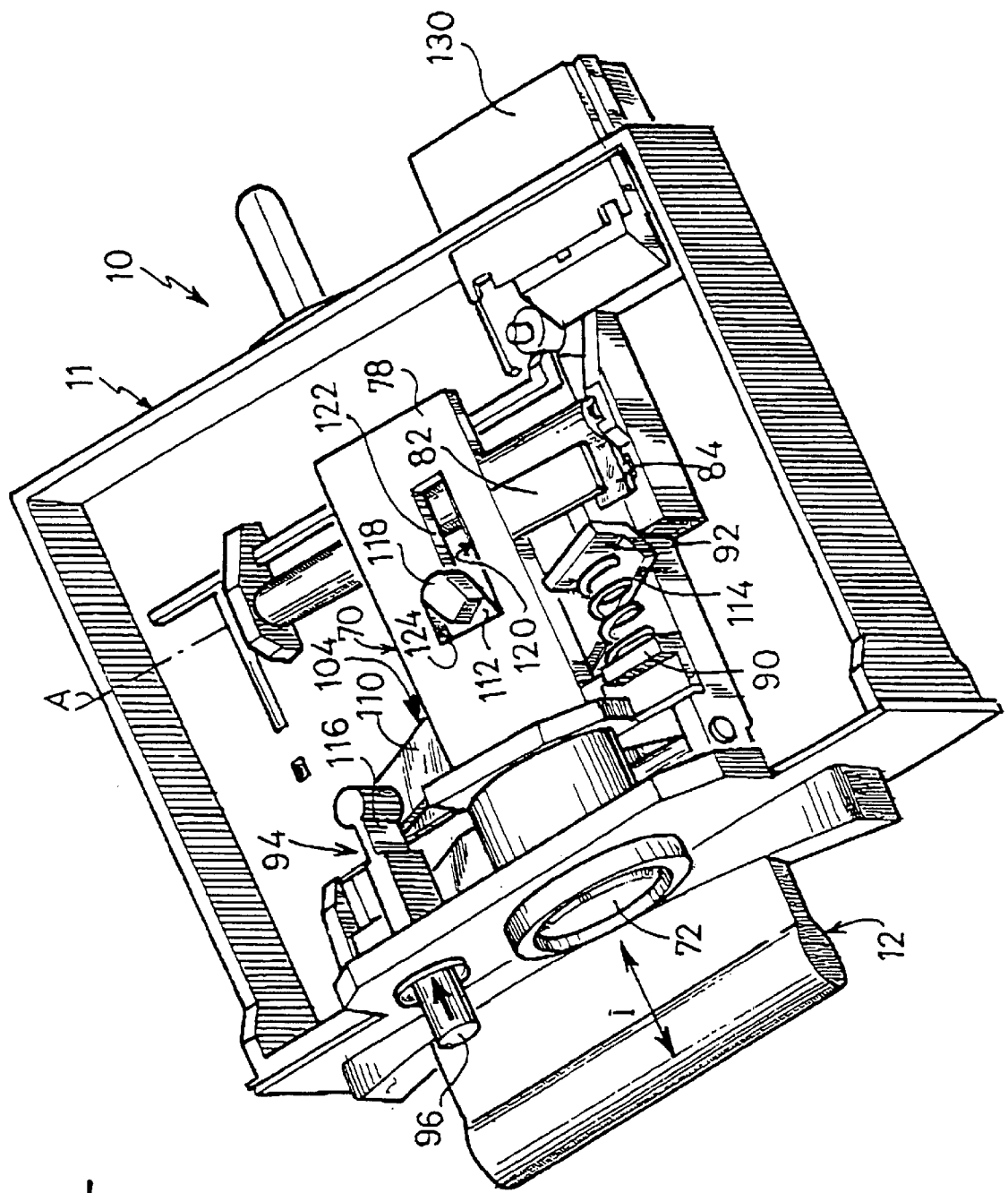
FIG. 4 is a view similar to that of FIG. 3, in which the "on" push-button is illustrated in the pushed-in "on" position.

The push-button 70 is mounted so that it can slide longitudinally, that is to say parallel to the direction I, between its extreme rear "out" position of rest illustrated in FIG. 3 and its extreme forward pushed-in "on" position illustrated in FIG. 4.

The push-button 70 is returned elastically toward its rear "out" position of rest by a helical compression spring 88 which is mounted compressed between a transverse bearing tab 90 of the plate 78 and a stop tab 92 opposite belonging to a second push-button 94.

The second push-button 94 belongs to a retaining mechanism for automatically keeping the "on" push-button 70 in the "on" position.

The push-button 94 comprises an actual push-button 96 which is mounted so that it can slide parallel to the direction I through corresponding holes 98 and 100 formed in the wall 21 and the front cover plate 15 so as to slide longitudinally parallel to the button 72, these two buttons being guided in a common guide piece 102.

The button 96 is an "off" push-button which is mounted so that it can slide between a pushed-in forward "off" position depicted in FIG. 3, and a rear "out" position of rest depicted in FIG. 3, toward which it is elastically urged by the spring 88.

The retaining mechanism for automatically keeping the push-button 70 in the "on" position comprises a rocker 104 which is mounted so that it can rock about a vertical axis V perpendicular to the direction I and to the horizontal overall plane of the badge 12.

The rocker 104 is a part in the overall shape of a plate arranged below the plate 78 of the "on" push-button 70 and which comprises a central body 106 pierced with a hole 108 for mounting the rocker 104 on a stub 109 of the chassis 11, so that this rocker can rotate about the axis V.

Originating from the central part 106, the rocker 104 has three radial and horizontal arms 110, 112 and 114, distributed with angular separations of approximately 90°.

The transverse arm 110 is a control arm on which the button 96 acts, the button 96 being as one with it in terms of translation although its plate-shaped free front end 116 is able to rotate relative to this arm about an axis parallel to the axis V.

The intermediate arm 112 extends longitudinally and generally forward and constitutes the arm for retaining the push-button 70.

For this purpose, at its front free end, it has a retaining finger 118 which extends vertically upward into an L-shaped slot 120 formed in the plate 78.

The slot 120 comprises a longitudinal section 122 and, at its rear longitudinal end, a perpendicular transverse section 124 directed toward the articulation between the button 96 and the control arm 110.

Finally, the return arm 114 extends transversely and its free end bears the tab 92 against which the spring 88 bears.

The way in which the arrangement according to the invention works will now be described with reference in particular to FIGS. 3 to 7.

When there is no badge 12 in the unit 14, as will be explained hereinafter, the "on" push-button 70, 72 is in its rear "out" position whereas the "off" push-button 94, 96 is in its pushed-in forward position, as is illustrated in FIGS. 3 and 5.

When the badge 12 is introduced longitudinally from rear to front when considering FIGS. 5 and 6, this badge automatically causes the immobilizing lever 34 to pivot, in the counterclockwise direction by considering FIGS. 5 and 6.

As can be seen in FIGS. 3 and 5, as long as the immobilizing lever 34 is in its retracted position, it is impossible for the push-button 70 to be pushed in longitudinally from left to right insofar as the transverse front edge 79 of the tab forming a locking finger 82 is facing the cylindrical arc-shaped surface 87 of the radial part 86 of the immobilizing lever 34, the user thus encountering resistance to the pushing-in of the button 72.

By contract, and as can be seen in FIG. 6, as soon as the immobilizing lever 34 is in its angular immobilizing position, the upper face 84 of the part 86 is horizontal and located under the tab 82, and it then becomes possible to push the button 72 in longitudinally to cause the assembly comprising the push-button 70 and the plate 78 to move from its "out" position illustrated in FIGS. 3 and 5, into its pushed-in position illustrated in FIGS. 4 and 7.

During this pushing-in action, there is a relative movement of the retaining finger 118 with respect to the plate 78, that is to say that the retaining finger 118 moves longitudinally, from front to rear, along the longitudinal section 122 to come even with the transverse section 124.

Insofar as the rocker 104 is constantly subjected to the action of the spring 88, it tends constantly to pivot about the axis V in the counterclockwise direction when considering FIGS. 3 and 4, that is to say that the retaining finger 118 then automatically enters the transverse section 124 of the slot 120 as soon as the button 72 reaches its pushed-in position depicted in FIGS. 4 and 7.

This pivoting of the rocker 104 in the counterclockwise direction under the action of the spring 88 causes the button 96 of the "off" push-button 94 to slide toward its "out" position illustrated in FIG. 4.

If the user releases his action on the "on" push-button 70, the latter remains in its pushed-in position illustrated in FIG. 4 because of the presence of the retaining finger 118 in the retaining section 124 of the slot 120.

In its pushed-in "on" position in which it is retained by the finger 118, the push-button 70 prevents any pivoting of the immobilizing lever 34 toward its retracted position because of the presence of the transverse locking finger 82 above the horizontal surface 84 of the radial part 86.

It is thus impossible to extract the badge 12 longitudinally from front to rear because the lever 34 is immobilized in terms of rotation, in the clockwise direction when considering FIG. 7.

To allow the badge 12 to be extracted again, the user has to use the "off" button 94 by pushing the button 96 which is in its "out" position of rest illustrated in FIG. 4.

As soon as the user pushes the button 96 in from rear to front, he causes the rocker 104 to rotate in the clockwise direction and this causes the retaining finger 118 to escape from the transverse section 124, returning this finger 118 to even with the longitudinal section 122.

As soon as this angular position, that of releasing the "on" push-button 70 is reached by the rocker 104, and under the effect of the return spring 88, the plate 78 (and therefore the entire "on" push-button assembly 70) is urged longitudinally from rear to front, automatically and simultaneously returning the two buttons 72 and 96 to their position illustrated in FIG. 3 in which the push-button 70 is once again in the "out" position of rest while the push-button 94 is once again in its pushed-in "off" position.

The sliding movements of the two buttons 72 and 96 are therefore always simultaneous, opposed, and antagonistic.

According to another aspect of the invention, the printed-circuit board 16 of the unit 14 carries an electrical connector 130, an antenna 132, and three switches 134, 136 and 138 which are arranged longitudinally in succession from rear to front when considering the longitudinal direction I in which the badge 12 is introduced into the unit 14.

As the badge 12 is gradually pushed into the unit 14, from rear to front, it acts in turn, via means which have not been depicted, first of all on the first switch 134, when the badge 12 has been pushed about halfway in, then on the second electric switch 136 when the badge 12 has been pushed all the way in, that is to say when it occupies its active position in the unit 14.

Action on the first switch 134 by partial introduction of the badge 12 allows power to be supplied to the "+" of the service supply of the electrical circuit for starting the vehicle, while its action on the second switch 136 allows power to be supplied to the "+" of the APC, that is to say the electrical power supply for the accessories.

The third switch 138 is an electric switch allowing power to be supplied to the "+" of the DEM, that is to say the electrical power supply for the vehicle engine starter.

According to one aspect of the invention, it is pushing in the push-button 70 into the "on" position that brings about actuation of the third switch 138, this actuation being brought about, for example, by the transverse front edge of the plate 78 of the push-button 70.

The invention is particularly applicable on board motor vehicles in which the anti-theft functions are partially or completely fulfilled by data processing, some of which data, contained in the medium or badge 12, represents an authorized user or a group of authorized users of the vehicle.

The data processing is, in particular, aimed at comparing the data contained in the badge 12 with data stored in memory on board the vehicle with a view to allowing authorized use of the vehicle, the processing circuit or circuits providing complete or partial control of anti-theft means, whether these be conventional anti-theft means, that is to say means which act on the vehicle steering column, and/or means for preventing the vehicle engine from being started and/or for interrupting the running of the engine.

What is claimed is:

1. An arrangement (10) for an interchange of data between a rigid or semi-rigid data medium (12) in an overall shape of a card and a data interchange device (14), particularly one for reading data contained in the medium, comprising a unit (11, 13, 16) in which the data medium (12) is introduce longitudinally into a housing of the unit in which the data medium occupies a given active position, of the type in which the unit comprises a lever (34) for immobilizing the medium (12) which lever is mounted to pivot (A) between an immobilizing position in which the lever longitudinally holds the data medium (12) in an active position in the unit, and a retracted position in which the data medium (12) can be extracted from the unit, and of the type in which the unit comprises a controlled member (70) for locking the immobilizing lever (34) in the lever's angular position for immobilizing the data medium (12), a finger (82) of which can extend facing a part (84, 86) of the immobilizing lever (34) so as to prevent the latter from rotating from the lever's active immobilizing position toward the lever's retracted position, wherein the immobilizing member is a member is a member that is controlled manually by a first "on" push-button (70) mounted to slide between a pushed-in "on" position in which the immobilizing lever (34) is locked in the immobilizing position, and an "out" position of rest toward which the lever is elastically returned, and wherein there is a retaining mechanism (104, 120, 118) for automatically keeping the first push-button (70) in the "on" position, the release of which is controlled by a second, "off" push-button (94) which is mounted to slide between an "out" position of rest toward which the button is elastically returned and a pushed-in "off" position in which the first "on" push-button (70) is free to slide.

2. The arrangement as claimed in claim 1, wherein the two push-buttons, namely the "on" button (70) and the "off" button (94), are mounted to slide parallel to the longitudinal direction (I) of insertion and extraction of the data medium (12) and wherein, in the "out" position, each push-button protrudes with respect to one and a same wall (21, 15) of the unit.

3. The arrangement as claimed in claim 2, wherein the mechanism for automatically retaining the "on" push-button comprises a rocker (104), mounted to pivot about a fixed axis (V) perpendicular to the direction in which the "off" push-button (94) slides, which comprises a control arm, a free end of which is connected in terms of translation of the "off" push-button (94, 106), and a retaining arm (112) which carries a retaining finger (118) which extends, parallel to the axis (V) of pivoting of the rocker (104), inside an L-shaped retaining slot (120) formed in the "on" push-button (70, 78) and which comprises a longitudinal section (122) parallel to the direction in which the "on" push-button slides and in which the retaining finger (118) moves when the "on" push-button (70) is pushed in from its "out" position of rest to its pushed-in "on" position, and comprises a transverse retaining section (124) which the retaining finger (118) automatically enters when the "on" push-button (70) reaches its pushed-in "on" position.

4. The arrangement as claimed in claim 3, wherein the "on" push-button (70) comprises a main plate (78) in which the L-shaped slot (120) is formed and which extends in a plane perpendicular to the axis (V) of pivoting of the retaining rocker (104).

5. The arrangement as claimed in claim 3, wherein the retaining rocker (104) comprises a return arm (114) on which a return spring (88) constantly acts to urge the rocker (104) to pivot in the direction that corresponds to the retaining finger (118) entering the transverse arm (124) of the L-shaped slot (120) and to the "off" push-button (94) being returned to the "out" position of rest.

6. The arrangement as claimed in claim 5, wherein the return spring (88) is a compression spring mounted longitudinally compressed between the free end (92) of the return arm (114) of the rocker (104) and a bearing tab (90) belonging to the "on" push-button (70, 78).

7. The arrangement as claimed in claim 1, wherein the axis (A) of pivoting of the immobilizing lever (34) is parallel to the plane in which the longitudinal direction (I) of insertion and extraction of the data medium (12) into the unit is located and is perpendicular to this longitudinal direction (I).

8. The arrangement as claimed in claim 7, wherein the immobilizing lever (34) comprises a radial tab (86, 87) which, when the immobilizing lever (34) is in the retracted position, extends across a path of the "on" push-button (78, 79, 82) so as to prevent the latter from being pushed in when there is no data medium (12) in an active position.

9. The arrangement as claimed in claim 1, wherein pushing the "on" push-button into the "on" position (70) operates an electric switch (138) borne by the unit (16).

10. The arrangement as claimed in claim 9, wherein said electric switch (138) is operated by a part (78) of the "on" push-button (78).

11. The arrangement as claimed in claim 1, and which is fitted to a motor vehicle in which an anti-theft functions are partially or completely fulfilled by data processing, some of which data, contained in the data medium (12), represents an authorized user or a group of authorized users of a vehicle.

12. The arrangement as claimed in claim 11, wherein a switch (138) belongs to a circuit that supplies electrical power to the vehicle engine starter.

* * * * *